United States Patent
Gollier

(10) Patent No.: US 8,690,342 B2
(45) Date of Patent: Apr. 8, 2014

(54) ENERGY TRANSFER IN SCANNING LASER PROJECTORS

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 458 days.

(21) Appl. No.: 13/205,706

(22) Filed: Aug. 9, 2011

(65) Prior Publication Data

US 2012/0050692 A1 Mar. 1, 2012

Related U.S. Application Data

(60) Provisional application No. 61/378,578, filed on Aug. 31, 2010.

(51) Int. Cl.
*G03B 21/00* (2006.01)

(52) U.S. Cl.
USPC .............................................................. 353/31

(58) Field of Classification Search
USPC ................ 353/31; 348/771; 359/196.1–226.3
See application file for complete search history.

(56) References Cited

U.S. PATENT DOCUMENTS

| | | | |
|---|---|---|---|
| 7,920,610 | B2 | 4/2011 | Loeber et al. |
| 2010/0098116 | A1 | 4/2010 | Bhatia et al. |
| 2010/0177285 | A1 | 7/2010 | Sakakibara |
| 2010/0182668 | A1 * | 7/2010 | Abe et al. ................... 359/202.1 |

OTHER PUBLICATIONS

PCT Application No. PCT/US2011/049623 filed Aug. 30, 2011; Annex to Form PCT/ISA/206—Communication Relating to the Results of the Partial International Search.

* cited by examiner

*Primary Examiner* — Georgia Y Epps
*Assistant Examiner* — Danell L Owens
(74) *Attorney, Agent, or Firm* — Joseph M. Homa

(57) ABSTRACT

The present disclosure introduces a number of image compression schemes designed to optimize operational efficiency in laser scanning projectors. Contemplated compression modes include, but are not limited to, intra-frame energy transfer, inter-frame energy transfer, and combinations thereof. The image compression modes disclosed herein are equally applicable to native laser sources and synthetic sources, such as green lasers based on a non-linear wavelength conversion. In cases where multiple lasers are used together in a multi-color projection system, it will often be preferable to favor particular image compression modes for particular colors, particularly where image brightness is more readily attributable to one color, e.g., green, because of the spectral responsivity of the human eye.

19 Claims, 4 Drawing Sheets

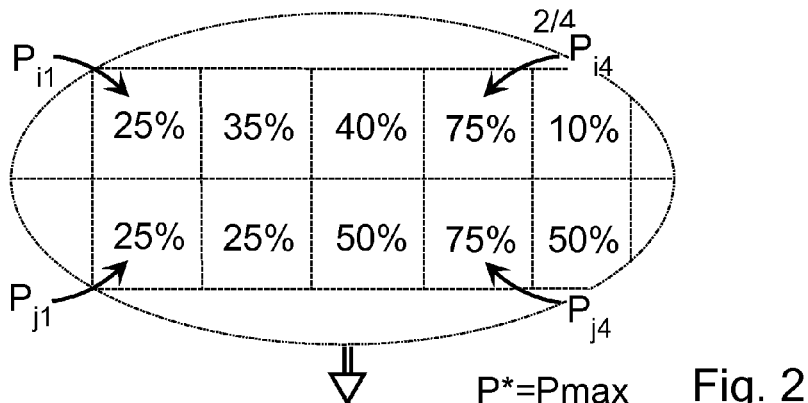
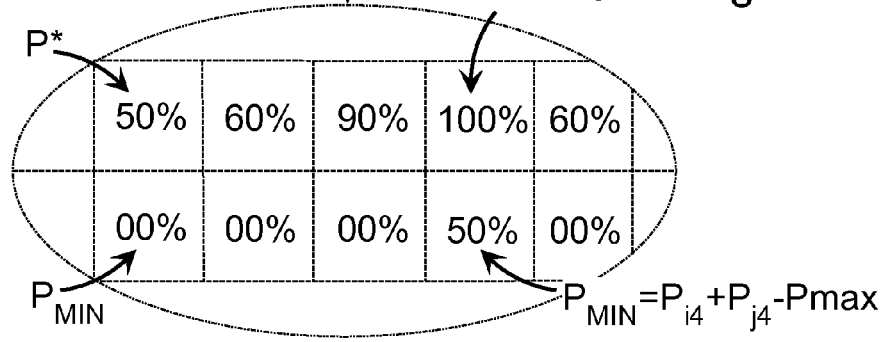
Fig. 2
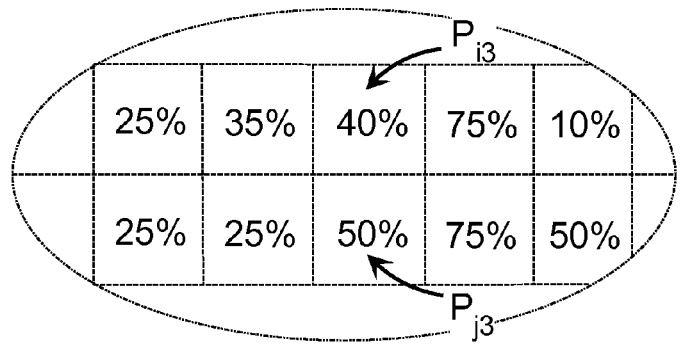
Fig. 3
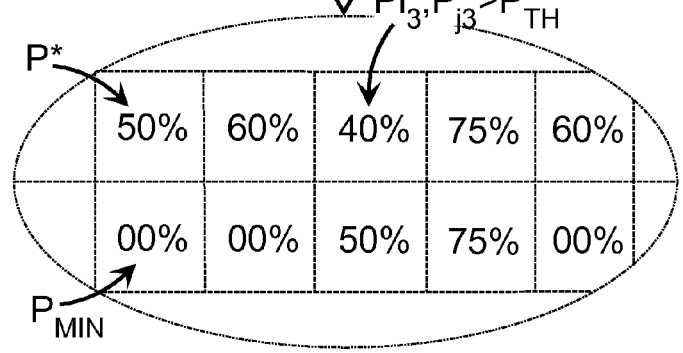

ENERGY TRANSFER IN SCANNING LASER PROJECTORS

CROSS-REFERENCE TO RELATED APPLICATION

This application claims be benefit of priority under 35 U.S.C. §119 of U.S. Provisional Application Ser. No. 61/378,578, filed on Aug. 31, 2010, the content of which is relied upon and incorporated herein by reference in its entirety.

BACKGROUND

The present disclosure relates to laser scanning projectors and, more particularly, to a method for optimizing efficiency of laser scanning projectors.

BRIEF SUMMARY

By way of example, and not limitation, the present inventor has recognized that, for laser scanning projectors, the desired output intensity varies based on image content and is generally less than optimum at relatively low intensity values. For portable image projection applications, one of the key parameters is battery life and the most descriptive way of defining the impact of the green laser source on battery life, is to consider the wall plug efficiency of the projector under image modulation conditions.

More specifically, lasers typically used in laser scanning projectors have a relatively large threshold current (about 40 mA) and the voltage at which the laser needs to be driven is also relatively high (around 4V at 50 mA). As a consequence, these lasers are typically characterized by relatively low operating efficiency because, for low output intensities, they will consume at least 160 mW, even if only a few mW of optical output needs to be produced by the laser. The manner in which a laser diode is driven can also adversely affect efficiency, frequently requiring relatively high minimum power consumption for relatively low optical power. As a result, operating efficiency drops significantly at low brightness levels. Accordingly, the present disclosure presents novel ways of modifying the way that laser scanning projector images are produced to drive the laser as close as possible to its maximum current.

For example and by way of illustration, not limitation, the aforementioned recognition is particularly true in the context of short wavelength sources where the output of a semiconductor laser is optically coupled with the waveguide of a light wavelength conversion device, such as a second harmonic generation (SHG) crystal. The SHG crystal can be configured to generate higher harmonic waves of the fundamental laser signal by tuning, for example, a 1060 nm DBR or DFB laser to the spectral center of the crystal, which converts the wavelength to 530 nm. The wavelength conversion efficiency of the SHG crystal, such as MgO-doped periodically poled lithium niobate (PPLN), is strongly dependent on the intensity of the fundamental laser signal and can be optimized by maximizing the intensity of the fundamental signal.

The present disclosure introduces a number of image compression schemes designed to optimize operational efficiency in laser scanning projectors. Contemplated compression modes include, but are not limited to, intra-frame energy transfer, inter-frame energy transfer, and combinations thereof. The image compression modes disclosed herein are equally applicable to native laser sources and synthetic sources, such as green lasers based on a non-linear wavelength conversion.

In cases where multiple lasers are used together in a multi-color projection system, it will often be preferable to favor particular image compression modes for particular colors, particularly where image brightness is more readily attributable to one color, e.g., green, because of the spectral responsivity of the human eye.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2 is a diagram illustrating a more aggressive variation of the methodology illustrated in FIG. 1;

FIG. 3 is a diagram illustrating a less aggressive variation of the methodology illustrated in FIG. 1;

DETAILED DESCRIPTION

Figure 1:
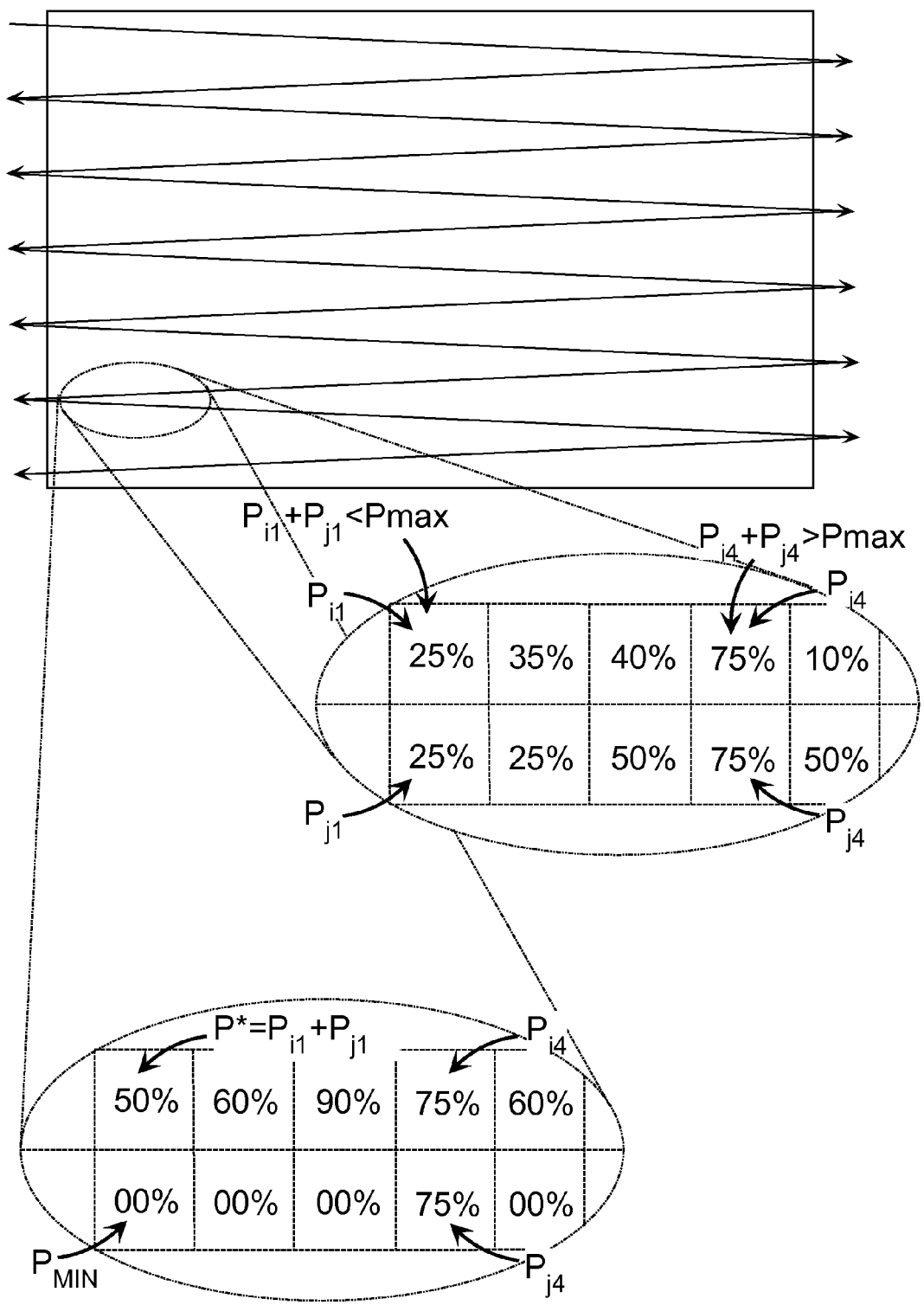
FIG. 1 is a diagram illustrating a method of operating a laser scanning projector according to one embodiment of the present disclosure, and is referred to herein as intra-frame energy transfer.

FIG. 1 illustrates a method of operating a laser scanning projector where intra-frame energy transfer is employed to optimize operational efficiency in the projector. Generally, as will be appreciated by those familiar with laser scanning projectors, a semiconductor laser and associated scanning optics can be configured to scan a projected laser beam through a 2D array of image pixels of successive image frames. In order to avoid complexity, we will consider here only one single color. However, it should be understood that, when multiple lasers are being used to create different colors, the algorithm can be applied to any or all colors forming the projected image. According to the method illustrated in FIG. 1, desired intensity values P are identified for a group of neighboring pixels in the 2D array of image pixels. The neighboring pixels, which may comprise a simple, directly adjacent pair of pixels or a more complex group of neighboring pixels that are not directly adjacent to each other, lie along separate scan lines of the array and are each characterized by a desired intensity value P, i.e., $P_{i1}, P_{j1}, \ldots P_{i4}, P_{j4}, \ldots$ where, for instance, $P_{i4}$ represents, for a given image frame, the intensity value at line i and column 4.

To execute the aforementioned intra-frame energy transfer, let us consider two neighboring pixels such as $P_{i1}$ and $P_{i2}$. Energy from one pixel is transferred to the other in such a way that a minimized intensity value $P_{MIN}$ is attributed to one of the two pixels and a compensatory intensity value P* is attributed to the other of the two pixels is maintained to insure that the average local intensity of the image has not been changed. To get the maximum gain in efficiency, according to one embodiment, one of the two pixels is set at zero and the remaining pixel is set at the sum of the two intensities $P_{i1}+P_{i2}$.

As will be appreciated by those practicing aspects of the present disclosure, the laser cannot produce an infinite level of power so, in cases where $P_{i1}+P_{i2}$ is larger than the maximum power that can be produced by the laser, consideration must be made for $P_{MAX}$, which corresponds to the maximum power level that can be produced by the laser. $P_{MAX}$ can, for example, correspond to the maximum image local brightness, which in some cases corresponds to a 255 image grey level. In other cases, it can also correspond to the laser brightness that is produced when the laser is driven at its maximum driving current. In further cases, $P_{MAX}$ can correspond to the maximum brightness that guarantees that the projector remains a class 2 laser. In the particular example illustrated in FIG. 1, $P_{i1}$ and $P_{j1}$ each have a 25% intensity value, i.e., the intensity is 25% of $P_{MAX}$. So, if $P_{j1}$ is minimized to zero intensity value (00%), then the compensatory intensity value P* must be large enough to compensate for the 25% difference between the desired intensity value $P_{j1}$ (25%) of the selected pixel and the minimized intensity value $P_{MIN}$ (00%) of the selected pixel. Given that the desired intensity value $P_{i1}$ is 25%, P* is set to 50%, a 25% increase in the initial intensity value of $P_{i1}$.

In general, for each pair of neighbor lines i and j and for each column k of the image, the minimized intensity value $P_{MIN}$ and the compensatory intensity value P* can be assigned as follows:

if $$P_{i,k}+P_{j,k} \leq P_{MAX}$$

then $$P^* = P_{i,k}+P_{j,k}$$

and $$P_{MIN}=0$$

where $P_{i1}$ and $P_{j1}$ represent desired intensity values of a group of neighboring pixels (two adjacent pixels in FIG. 1) and $P_{MAX}$ represents the maximum pixel intensity of the scanning laser projector (100% in FIG. 1). P* and PMIN are the assigned respectively to $P_{i,k}$ and $P_{j,k}$.

As is the case in the example illustrated in FIG. 1, if $$P_{i,k}+P_{j,k} > P_{MAX},$$

then the minimized intensity value $P_{MIN}$ and the compensatory intensity value P* are not assigned and the desired intensity values are not altered (see, e.g., $P_{i4}$ and $P_{j4}$ in FIG. 1). This adherence to a limitation on energy transfer can help ensure that energy transfer is only performed in relatively dark areas of the image, where resulting transfer lines will be less visible.

The aforementioned intra-frame energy transfer can be carried out on a line-by-line basis for each image frame displayed by the scanning laser projector utilizing minimized intensity values $P_{MIN}$ and compensatory intensity values P* for a plurality of groups of neighboring pixels in successive image frames. In the illustrated example, the series of pixel intensity values prior to the intra-frame energy transfer are dominated by pixel intensities of 50% or less. Following energy transfer, only one of the non-zero pixels is at 50% or less. Accordingly, the resulting projection scheme will be characterized by generally higher intensity values for individual pixels and will be less subject to the aforementioned efficiency shortcomings associated with low intensity values. Also, in the illustrated example, only one color was taken into consideration. A more general algorithm should consider intensities $P_{i,j,c}$ where the index c stands for one of the color of the image (like red, green and blue) and the algorithm should then be applied to each color separately. The present disclosure introduces a number of image processing steps that can be employed to limit any deleterious effects on image quality associated with the intra-frame energy transfer.

FIG. 2 illustrates a more aggressive variation of the methodology illustrated in FIG. 1, with specific reference to the desired intensity values $P_{i4}$ and $P_{j4}$. More specifically, for these two pixels, the sum of their two desired intensity values exceeds $P_{MAX}$ (100%) because each has a desired intensity value of 75%:

$$\Sigma P_{i4}, P_{j4}, \ldots > P_{MAX}(150\% \text{ in FIG. 2})$$

In cases like this, the minimized intensity value $P_{MIN}$ and the compensatory intensity value P* can be assigned as follows:

$$P^* = P_{MAX}(100\% \text{ in FIG. 2})$$

and $$P_{MIN}=(\Sigma P_{i1},P_{j1},\ldots)-P_{MAX}(50\% \text{ in FIG. 2}).$$

This more aggressive methodology will generally yield higher intensities in the high intensity scan line (line i in FIG. 2), as compared with the methodology illustrated in FIG. 1.

In many cases, it may be preferable to execute energy transfer only in the darkest areas of the image. To this end, FIG. 3 illustrates a less aggressive variation of the methodologies illustrated in FIGS. 1 and 2. In the embodiment illustrated in FIG. 3, if $$P_{i1},P_{j1}, \text{and} \ldots > P_{TH},$$

i.e., if all of the desired intensity values of the group of neighboring pixels are greater than a given threshold $P_{TH}$, then the minimized intensity value $P_{MIN}$ and the compensatory intensity value P* are not assigned and the original desired intensity values are maintained. For example, and not by way of limitation, a suitable threshold intensity value $P_{TH}$ may fall above about 35%, as is the case in FIG. 3 where columns 3 and 4 are not subject to energy transfer because the individual desired intensity values of the two groups of neighboring pixels are all above 35%.

Semiconductor lasers are typically characterized by a non-linear relationship between driving current and beam intensity. Accordingly, it is noted that the minimized intensity values $P_{MIN}$ and the compensatory intensity values P* discussed herein should be calibrated to account for the non-linearity of the semiconductor laser. Also, digital images are often stored with gamma correction factors, so the image algorithm needs to take all of the non linearity factors into account to avoid affecting the image color balance as well as the image contrast.

The present inventor has recognized that images resulting from the methodology described here may present some abrupt image variations resulting from areas where energy is transferred and areas where there is no transfer. To help mitigate the effects of these variations, the minimized intensity value $P_{MIN}$ and the compensatory intensity value P* can be assigned in partial dependence on a probability function that is inversely related to pixel intensity:

$$\Sigma P_{i1},P_{j1}, \ldots.$$

In many cases, it will be preferable to limit the role of the probability function by ensuring that it does not factor into the assignment of the minimized intensity value $P_{MIN}$ or the compensatory intensity value P*, particularly where $$\Sigma P_{i1},P_{j1}, \ldots$$

is above or below a predetermined range of summed intensities. For example, it is contemplated that the probability function can be utilized such that it will only come into play if $$P_F(P_{MAX}) \leq (\Sigma P_{i1}, P_{j1}, \dots) \leq P_{MAX}.$$

One suitable probability function is defined as follows:

$$\frac{P_{MAX} - P}{(1 - P_F)P_{MAX}}$$

where $P_{MAX}$ represents the maximum pixel intensity of the scanning laser projector and $P_F$ represents a predetermined fraction of $P_{MAX}$, e.g., $P_F$ can be about 75% of $P_{MAX}$ or another value tailored to define the role of the probability function.

In some cases, it may be preferable to limit the applicability of the energy transfer operations described herein so that they are only applied at edge portions of the image rather than near the center. More specifically, this limitation may be attractive because scanning laser projectors are typically driven at lower power at the edge of the image to compensate for the fact that the flying spot is slower at the edge of the image than at the center of the image. Accordingly, the methodology described herein is expected to be more efficient at the relatively low power edge portions of the image, than at the center of the image. In addition, observer attention is not usually focused on the edge of an image, so the edge portions can tolerate some image degradation at the edges. Finally, due to the nature of scanning projectors, image resolution is often lower at the edge portions of an image because line separation is lower at the edge than at the center. To minimize the visibility of image lines generated by the method, energy transfer should preferably be done where the line separation is relatively low, i.e., at edge portions of the image.

A threshold desired intensity value $P_{TH}$ can be established and used to implement energy transfer that varies across an image of a scanning laser projector. More specifically, the minimized intensity values $P_{MIN}$ and the compensatory intensity values P* can be assigned in partial dependence on the threshold desired intensity value $P_{TH}$ and the threshold desired intensity value $P_{TH}$ can be set relatively high in edge portions of the 2D array of image pixels and relatively low in central portions of the 2D array of image pixels. Energy transfer can be limited to preferred areas of the image through proper tailoring of the threshold desired intensity value $P_{TH}$.

Also, since the method can result in some image resolution degradation, it is contemplated that it may be preferable to utilize various combinations of conventional or yet to be developed image processing protocols, algorithms, or other techniques. For example, and not by way of limitation, it may be preferable to limit the use of the algorithms described herein to circumstances where pictures or movies are being projected. More specifically, it is contemplated that the subject algorithms could be switched off when images demanding relatively high resolution, such as text, need to be projected. It is also contemplated that, due to the spectral responsivity of the human eye, most of the image brightness is attributable to green frames. Consequently, it is usually more important to maintain relatively high resolution in green, as compared to blue or on red. Given this emphasis on resolution in green, it is contemplated that application of the algorithm can be limited to the blue and/or red frames.

Figure 4:
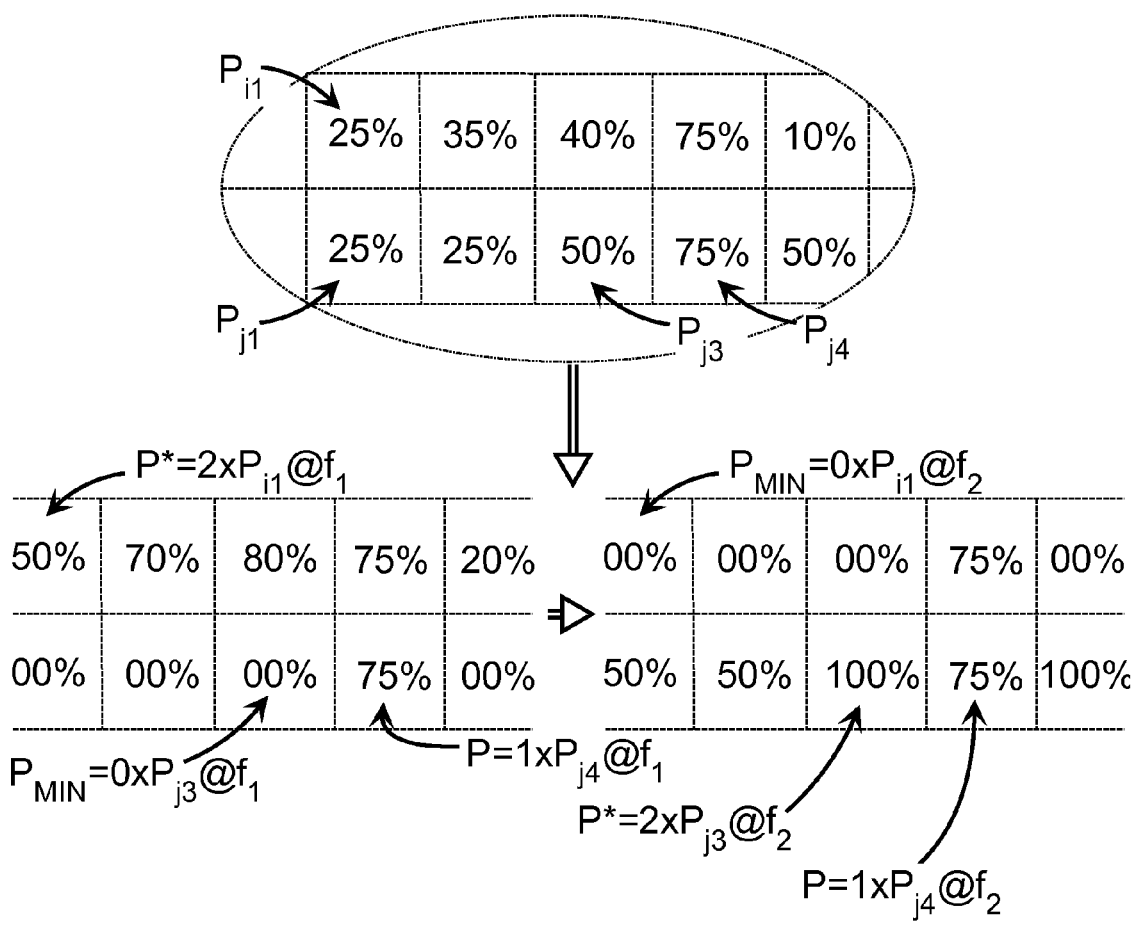
FIG. 4 is a diagram illustrating a method of operating a laser scanning projector according to another embodiment of the present disclosure, and is referred to herein as inter-frame energy transfer.

FIG. 4 is a diagram illustrating a method of operating a laser scanning projector according to an embodiment of the present disclosure referred to herein as inter-frame energy transfer. For inter-frame energy transfer, desired intensity values are identified for a series of pixels in a common portion of successive image frames, as opposed to pixels in neighboring scan lines of a single image frame, as is the case with intra-frame energy transfer. For clarity of illustration, it is assumed that the desired intensity value of the pixels $P_{i1}$, $P_{j1}$, ... do not vary across the first and second frames $f_1$, $f_2$. So, for the first and second frames $f_1$, $f_2$, the desired intensity value $P_{i1}@f_1$ and $P_{i2}@f_2$ will be 25%.

Figure 5:
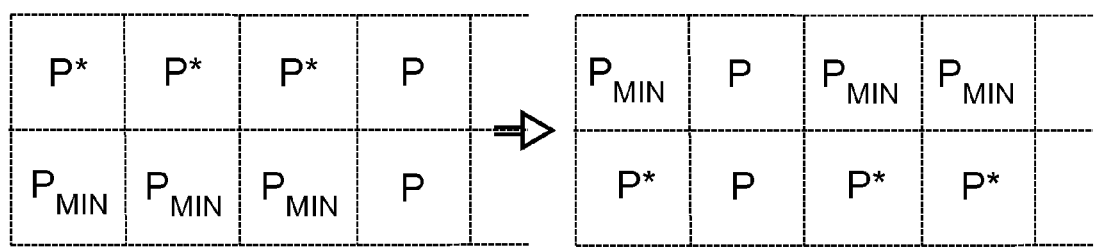
FIG. 5 is a diagram illustrating a image enhancement technique according to one embodiment of the present disclosure.
Figure 6:
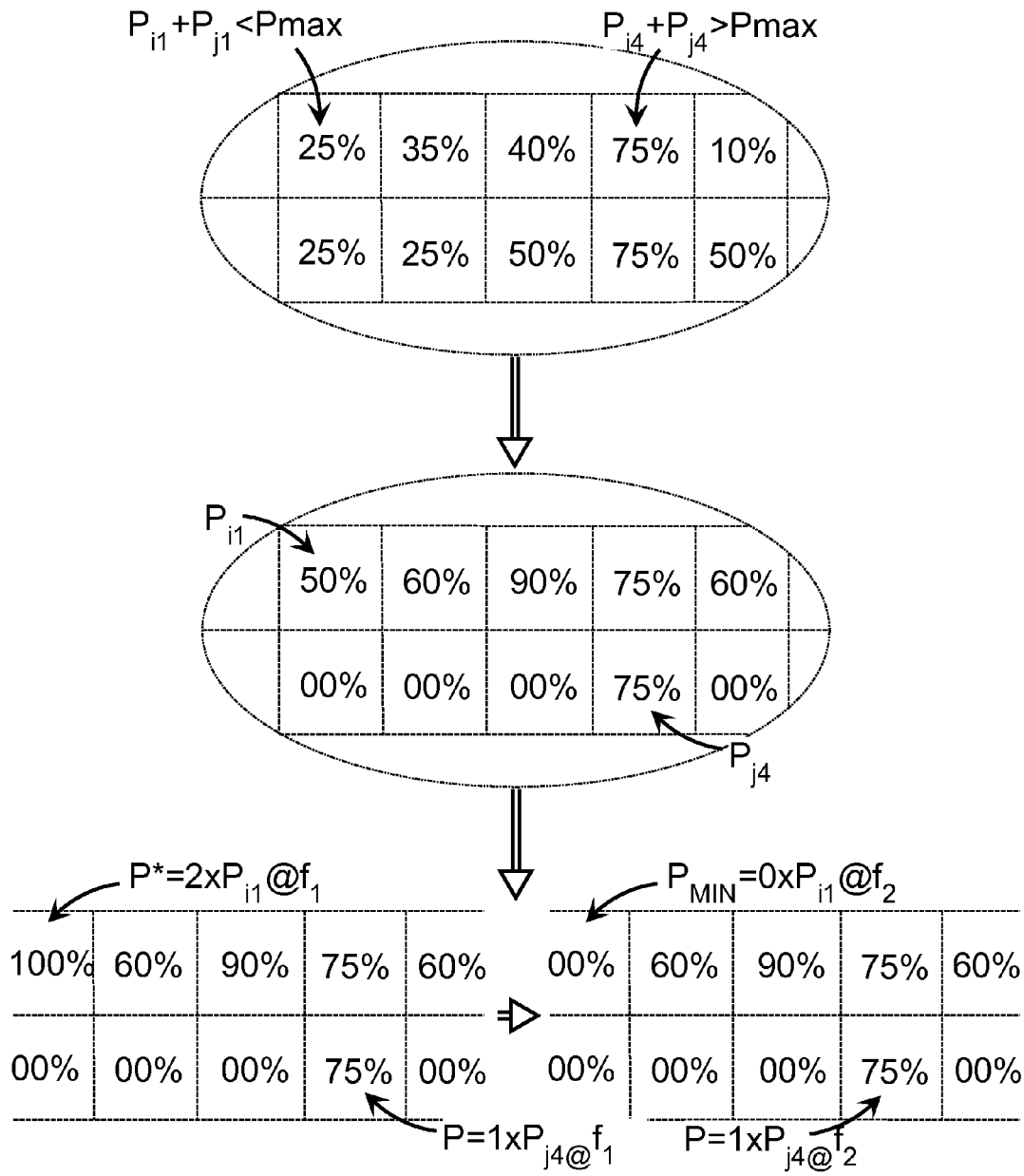
FIG. 6 is a diagram illustrating a method of operating a laser scanning projector combining intra-frame energy transfer and inter-frame energy transfer.

For inter-frame energy transfer, the minimized intensity value $P_{MIN}$ and the compensatory intensity value P* are assigned to individual pixels of a series of pixels in successive frames. In the illustrated embodiment, two successive frames form the series of pixels but it is contemplated that the series of frames may include more than two frames and that the frames need not be in direct succession. In the embodiment illustrated in FIG. 4, P* is assigned to the first frame $f_1$ and $P_{MIN}$ is assigned to the second frame $f_2$. Beyond this, all of the aforementioned alternatives to and variations of the particular intra-frame energy transfer methodologies described herein will have analogous use in the context of inter-frame energy transfer. In addition, it is noted that inter-frame energy transfer is particularly susceptible to image degradation arising from repeating bright and dark lines in the image. Accordingly, as is illustrated in FIG. 5, it is contemplated that the minimized intensity values $P_{MIN}$ can be assigned to alternate between odd and even scan lines across successive image frames. In other words, even lines of $f_1$ can be assigned $P_{MIN}$, odd lines of $f_1$ can be assigned $P_{MAX}$ while even lines of $f_2$ get assigned $P_{MAX}$ and odd lines of $f_2$ can be assigned $P_{MIN}$. Finally, it is noted that the intra-frame and inter-frame energy transfer methodologies described herein can be combined to further optimize efficiency. FIG. 6 illustrates the manner in which the intra-frame energy transfer of FIG. 1 can be combined with the inter-frame energy transfer of FIG. 4.

It is also contemplated that projectors operating according to the principles disclosed herein can be configured to select between different image compression modes. As an example, when projecting movies with fast moving objects in the image, inter-frame energy transfer can create some image artifacts and the intra-frame algorithm is probably preferable. When projecting pictures that are mostly still and where higher resolution is usually needed, inter-frame energy transfer is probably optimum. When projecting text where most of the image pixels are usually set at the maximum brightness level and image resolution is crucial, it is usually preferred to avoid any type of image compression that can damage text readability.

It is noted that control signals disclosed herein may include return-to-zero (RZ) or wavelength recovery components similar to those disclosed in published US Patent Application 2008/0089373 A1. In addition, it is noted that the concepts of the present disclosure are applicable to a variety of laser sources and a variety of applications, including RGB and other multi-color laser scanning projectors.

Having described the subject matter of the present disclosure in detail and by reference to specific embodiments thereof, it will be apparent that modifications and variations are possible without departing from the scope of the invention defined in the appended claims. In addition, although some aspects of the present disclosure are identified herein as preferred or particularly advantageous, it is contemplated that the present disclosure is not necessarily limited to these aspects. For example, although FIGS. 1-6 clearly illustrate row-type scan lines, it is contemplated that these scan lines can be oriented as rows or columns of an image frame. Further, although FIGS. 1-6 illustrate $P_{MAX}$ at 100% and $P_{MIN}$ at 00%, it is contemplated that these values are not absolute and are given as examples only.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The invention claimed is:

1. A method of operating a scanning laser projector comprising at least one semiconductor laser and scanning optics configured to scan a projected laser beam through a 2D array of image pixels of successive image frames, wherein the method comprises:
    identifying desired intensity values for groups of neighboring pixels in the 2D array of image pixels, wherein the neighboring pixels of a group lie along separate scan lines of the array and are each characterized by a desired intensity value P;
    assigning a minimized intensity value $P_{MIN}$ to a selected pixel of a group of neighboring pixels;
    assigning a compensatory intensity value P* to a remaining pixel of the group of neighboring pixels, wherein the compensatory intensity value P* is selected to compensate for an intensity difference between the desired intensity value P of the selected pixel and the minimized intensity value $P_{MIN}$ of the selected pixel; and
    displaying an image with the scanning laser projector utilizing minimized intensity values $P_{MIN}$ and compensatory intensity values P* for a plurality of groups of neighboring pixels in successive image frames, wherein the minimized intensity value $P_{MIN}$ and the compensatory intensity value P* are assigned as follows:

if $\Sigma P_{i1}, P_{j1}, \ldots \leq P_{MAX}$ then $P^* = \Sigma P_{i1}, P_{j1}, \ldots$ and $P_{MIN} = 0$ where $P_{i1}$ and $P_{j1}$ represent desired intensity values of a group of neighboring pixels and $P_{MAX}$ represents the maximum pixel intensity of the scanning laser projector.

2. A method of operating a scanning laser projector as claimed in claim 1 wherein if $\Sigma P_{i1}, P_{j1}, \ldots > P_{MAX}$ then the minimized intensity value $P_{MIN}$ and the compensatory intensity value P* are not assigned.

3. A method of operating a scanning laser projector as claimed in claim 1 wherein if $\Sigma P_{i1}, P_{j1}, \ldots > P_{MAX}$ then the minimized intensity value $P_{MIN}$ and the compensatory intensity value P* are assigned as follows:

$P^* = P_{MAX}$ and $P_{MIN} = (\Sigma P_{i1}, P_{j1}, \ldots) - P_{MAX}$.

4. A method of operating a scanning laser projector as claimed in claim 1 wherein if $P_{i1}, P_{j1}, \text{and} \ldots > P_{TH}$ then the minimized intensity value $P_{MIN}$ and the compensatory intensity value P* are not assigned, where $P_{TH}$ represents a threshold desired intensity value.

5. A method of operating a scanning laser projector comprising at least one semiconductor laser and scanning optics configured to scan a projected laser beam through a 2D array of image pixels of successive image frames, wherein the method comprises:
    identifying desired intensity values for groups of neighboring pixels in the 2D array of image pixels, wherein the neighboring pixels of a group lie along separate scan lines of the array and are each characterized by a desired intensity value P;
    assigning a minimized intensity value $P_{MIN}$ to a selected pixel of a group of neighboring pixels;
    assigning a compensatory intensity value P* to a remaining pixel of the group of neighboring pixels, wherein the compensatory intensity value P* is selected to compensate for an intensity difference between the desired intensity value P of the selected pixel and the minimized intensity value $P_{MIN}$ of the selected pixel; and
    displaying an image with the scanning laser projector utilizing minimized intensity values $P_{MIN}$ and compensatory intensity values P* for a plurality of groups of neighboring pixels in successive image frames, wherein the minimized intensity value $P_{MIN}$ and the compensatory intensity value P* are assigned in partial dependence on a threshold desired intensity value $P_{TH}$ above which the minimized intensity value $P_{MIN}$ and the compensatory intensity value P* are not assigned.

6. A method of operating a scanning laser projector as claimed in claim 5 wherein the minimized intensity value $P_{MIN}$ and the compensatory intensity value P* are assigned in partial dependence on a probability function.

7. A method of operating a scanning laser projector as claimed in claim 6 wherein the probability function defines a probability of assignment that is inversely related to $\Sigma P_{i1}, P_{j1}, \ldots$.

8. A method of operating a scanning laser projector as claimed in claim 6 wherein the probability function does not factor into the assignment of the minimized intensity value $P_{MIN}$ and the compensatory intensity value P* where $\Sigma P_{i1}, P_{j1}, \ldots$ is above or below a predetermined range of summed intensities.

9. A method of operating a scanning laser projector as claimed in claim 5 wherein:

if $P_F(P_{MAX}) \leq (\Sigma P_{i1}, P_{j1}, \ldots) \leq P_{MAX}$ then the minimized intensity value $P_{MIN}$ and the compensatory intensity value P* are assigned in partial dependence on the following probability function:

$$\frac{P_{MAX} - P}{(1 - P_F)P_{MAX}}$$

where $P_{MAX}$ represents the maximum pixel intensity of the scanning laser projector and $P_F$ represents a predetermined fraction of $P_{MAX}$.

10. A method of operating a scanning laser projector as claimed in claim 5 wherein:
the scanning laser projector comprises a plurality of semiconductor lasers operating as a multi-color laser projector;
one of the plurality of semiconductor lasers operates in a frequency band that is characterized by relatively high spectral responsivity with respect to the human eye;
the semiconductor laser characterized by relatively high spectral responsivity is operated without utilizing the minimized intensity values $P_{MIN}$ and compensatory intensity values P*.

11. A method of operating a scanning laser projector as claimed in claim 5 wherein the threshold desired intensity value $P_{TH}$ is relatively high at edge portions of the 2D array of image pixels, as compared with central portions of the 2D array of image pixels.

12. A method of operating a scanning laser projector as claimed in claim 5 wherein the assignment of minimized intensity values $P_{MIN}$ and compensatory intensity values P* to pixels of groups of neighboring pixels defines an intra-frame energy transfer and the method further comprises execution of an inter-frame energy transfer in addition to the intra-frame energy transfer, the inter-frame energy transfer comprising:
identifying desired intensity values, as modified by the intra-frame energy transfer, for a series of pixels in a common portion of the successive image frames, wherein individual pixels of the series of pixels lie in separate image frames and are each characterized by a desired intensity value P;
assigning a further processed minimized intensity value $P_{MIN}$ to a selected pixel of the series of pixels; and
assigning a further processed compensatory intensity value P* to a remaining pixel of the series of pixels.

13. A method of operating a scanning laser projector comprising a semiconductor laser and scanning optics configured to scan a projected laser beam through a 2D array of image pixels of successive image frames, wherein the method comprises:
identifying desired intensity values for a series of pixels in a common portion of the successive image frames, wherein individual pixels of the series of pixels lie in separate image frames and are each characterized by a desired intensity value P;
assigning a minimized intensity value $P_{MIN}$ to a selected pixel of the series of pixels;
assigning a compensatory intensity value P* to a remaining pixel of the series of pixels, wherein the compensatory intensity value P* is selected to compensate for an intensity difference between the desired intensity value P of the selected pixel and the minimized intensity value $P_{MIN}$ assigned to the selected pixel; and
displaying an image with the scanning laser projector utilizing minimized intensity values $P_{MIN}$ and compensatory intensity values P* for a plurality of groups of neighboring pixels in successive image frames.

14. A method of operating a scanning laser projector as claimed in claim 13 wherein minimized intensity values $P_{MIN}$ are assigned to alternate between odd and even scan lines across successive image frames.

15. A method of operating a scanning laser projector as claimed in claim 13 wherein the assignment of minimized intensity values $P_{MIN}$ and compensatory intensity values P* to the series of pixels defines an inter-frame energy transfer and the method further comprises execution of an intra-frame energy transfer in addition to the inter-frame energy transfer, the intra-frame energy transfer comprising:
identifying desired intensity values, as modified by the intra-frame energy transfer, for groups of neighboring pixels in the 2D array of image pixels, wherein the neighboring pixels of a group lie along separate scan lines of the array and are each characterized by a desired intensity value P;
assigning a further processed minimized intensity value $P_{MIN}$ to a selected pixel of a group of neighboring pixels;
assigning a further processed compensatory intensity value P* to a remaining pixel of the group of neighboring pixels.

16. A method of operating a scanning laser projector as claimed in claim 13 wherein:
the scanning laser projector comprises a plurality of semiconductor lasers operating as a multi-color laser projector;
one of the plurality of semiconductor lasers operates in a frequency band that is characterized by relatively high spectral responsivity with respect to the human eye;
the semiconductor laser characterized by relatively high spectral responsivity is operated without utilizing the minimized intensity values $P_{MIN}$ and compensatory intensity values P*.

17. A scanning laser projector comprising a semiconductor laser, scanning optics, and an operating system programmed to utilize the semiconductor laser and the scanning optics to scan a projected laser beam through a 2D array of image pixels of successive image frames, wherein the operating system is programmed to display an image in successive image frames by:
identifying desired intensity values for groups of neighboring pixels in the 2D array of image pixels or for a series of pixels in a common portion of the successive image frames, wherein the neighboring pixels of a group lie along separate scan lines of the array and are each characterized by a desired intensity value P and individual pixels of the series of pixels lie in separate image frames and are each characterized by a desired intensity value P;
assigning a minimized intensity value $P_{MIN}$ to a selected pixel of a group of neighboring pixels or to a selected pixel of the series of pixels; and
assigning a compensatory intensity value P* to a remaining pixel of the group of neighboring pixels or to a remaining pixel of the series of pixels, wherein the compensatory intensity value P* is selected to compensate for an intensity difference between the desired intensity value P of the selected pixel and the minimized intensity value $P_{MIN}$ of the selected pixel.

18. A scanning laser projector as claimed in claim 17 wherein:
desired intensity values are identified for the groups of neighboring pixels in the 2D array of image pixels and for the series of pixels in a common portion of the successive image frames;

the minimized intensity value $P_{MIN}$ is assigned to a selected pixel of a group of neighboring pixels and to a selected pixel of the series of pixels; and the compensatory intensity value P* is assigned to a remaining pixel of the group of neighboring pixels and to a remaining pixel of the series of pixels.

19. A scanning laser projector as claimed in claim 17 wherein:

the minimized intensity value $P_{MIN}$ and the compensatory intensity value P* are assigned to the series of pixels following assignment of the minimized intensity value $P_{MIN}$ and the compensatory intensity value P* to the neighboring pixels; or the minimized intensity value $P_{MIN}$ and the compensatory intensity value P* are assigned to the neighboring pixels following assignment of the minimized intensity value $P_{MIN}$ and the compensatory intensity value P* to the series of pixels.

* * * * *